United States Patent
Khilnani et al.

(10) Patent No.: US 8,811,167 B2
(45) Date of Patent: Aug. 19, 2014

(54) SHAPING MULTIMEDIA STREAM BIT-RATES TO ADAPT TO NETWORK CONDITIONS

(75) Inventors: Sarat Khilnani, Cupertino, CA (US); Duanpei Wu, San Jose, CA (US); Shih-cheng Stan Yang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 355 days.

(21) Appl. No.: 13/034,244

(22) Filed: Feb. 24, 2011

(65) Prior Publication Data

US 2012/0218887 A1    Aug. 30, 2012

(51) Int. Cl.
*H04L 12/28* (2006.01)
*H04L 12/56* (2006.01)

(52) U.S. Cl.
CPC .................................. *H04L 47/18* (2013.01)
USPC ........................ 370/230; 370/235; 370/252

(58) Field of Classification Search
CPC ........................................................ H04L 47/18
USPC ........................................ 370/230, 235, 252
See application file for complete search history.

(56) References Cited

U.S. PATENT DOCUMENTS

| 6,392,789 | B1 * | 5/2002 | Paek et al. ................... 359/341.1 |
| 7,170,938 | B1 | 1/2007 | Cote et al. |
| 7,190,723 | B2 | 3/2007 | Schoenblum |
| 7,236,521 | B2 | 6/2007 | Schoenblum |
| 7,477,688 | B1 | 1/2009 | Zhang et al. |
| 2005/0002400 | A1 * | 1/2005 | Karol et al. ................... 370/394 |
| 2007/0153712 | A1 | 7/2007 | Fry et al. |
| 2007/0156924 | A1 | 7/2007 | Ramalingam et al. |
| 2009/0307367 | A1 * | 12/2009 | Gigliotti ........................ 709/231 |
| 2010/0020878 | A1 | 1/2010 | Liang et al. |
| 2010/0091716 | A1 * | 4/2010 | Bonta et al. ................... 370/329 |
| 2010/0188989 | A1 | 7/2010 | Wing et al. |
| 2010/0189095 | A1 * | 7/2010 | Ottur et al. ................... 370/352 |
| 2011/0063983 | A1 * | 3/2011 | Dang et al. ................... 370/242 |
| 2012/0180101 | A1 * | 7/2012 | Davis et al. ................... 725/116 |

* cited by examiner

*Primary Examiner* — Wanda Z Russell
(74) *Attorney, Agent, or Firm* — Edell, Shapiro & Finnan, LLC (57) ABSTRACT

An apparatus and methods are provided for shaping a transmit bit-rate of a multimedia stream to adapt to the bandwidth of network path on which the multimedia stream is sent between a source and destination. A condition indicative of a bandwidth of the network path is monitored, and at an intermediate point on the network path between the source and destination, the transmit bit-rate of the multimedia stream is adjusted to adapt to the condition indicative of the bandwidth of the path.

22 Claims, 9 Drawing Sheets

SHAPING MULTIMEDIA STREAM BIT-RATES TO ADAPT TO NETWORK CONDITIONS

TECHNICAL FIELD

The present disclosure relates to streaming video in a network.

BACKGROUND

In Internet Protocol (IP) networks, a multimedia stream, such as a video stream, flows from a source to a destination over a network path and through one or more network nodes, such as routers, switches, gateway devices, etc. Reliable delivery of a multimedia stream may require sufficient bandwidth throughout the network path to support the bit-rate of the multimedia stream. If the bandwidth of the network path is not sufficient, then the quality of the multimedia stream at the destination device may be degraded due to dropped packets, for example.

Measuring or predicting the bandwidth of the path for a multimedia stream may be difficult and imprecise. Some tools for measuring bandwidth may not be available across the network, and other tools do not provide an accurate measure of bandwidth.

DESCRIPTION OF EXAMPLE EMBODIMENTS

Overview

Techniques are provided for shaping a transmit bit-rate of a multimedia stream to adapt to the bandwidth of a network path on which the multimedia stream is being sent. A condition indicative of a bandwidth of the network path on which a multimedia stream is being sent from a source to a destination is monitored, and the transmit bit-rate of the multimedia stream is adjusted at an intermediate point between the source and destination on the network path to adapt to the condition indicative of the bandwidth of the network path.

Example Embodiments

Figure 1:
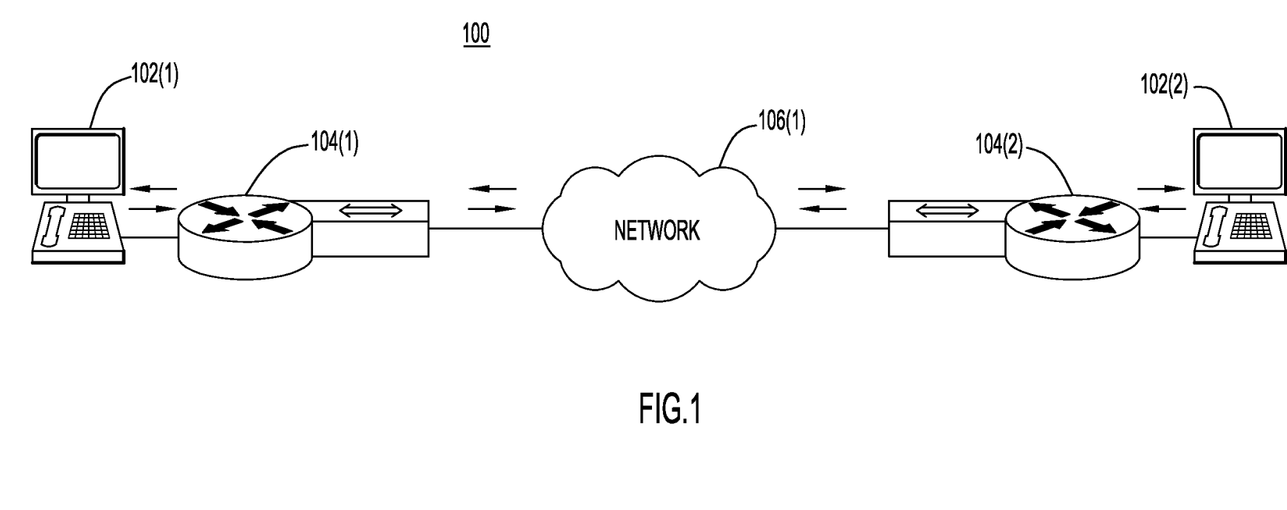
FIGS. 1 and 2 illustrate examples of systems in which devices in the path of a multimedia stream shape the transmit bit-rate of the multimedia stream.

Referring first to FIG. 1, a diagram is provided that illustrates an example of a system in which various devices in the path of a multimedia stream shape a bit-rate of the multimedia stream to adapt to a bandwidth of the network path on which the multimedia stream is transmitted. A multimedia stream delivery network 100 is shown comprising endpoint devices, e.g., videoconferencing devices 102(1) and 102(2) participating in a video point-to-point call. During a call session (e.g., a point-to-point call), videoconferencing device 102(1) sends a first multimedia stream along a network path to videoconferencing device 102(2), while videoconferencing device 102(2) sends a second multimedia stream along a network path to videoconferencing device 102(1).

The first multimedia stream travels on a network path from first videoconferencing device 102(1) through a first media bandwidth adaptation node (MBAN) 104(1), a network 106(1), and through a second MBAN 104(2) to second videoconferencing device 102(1). Videoconferencing devices 102(1) and 102(2) are devices that can capture and/or generate a multimedia stream and transmit the multimedia stream through a network interface. For example, videoconferencing devices 102(1) and 102(2) may be video phones, desktop computers, laptops, smart phones, or videogame consoles including a video camera and a network interface. Videoconferencing devices 102(1) and 102(2) may also include a display for displaying the multimedia stream received through the network interface. Videoconferencing devices 102(1) and 102(2) capture multimedia streams at a variable bit-rate, such as between 128 kbps and 4 Mbps. The multimedia stream may include audio and/or video, as well as accompanying data, such as a presentation made during a videoconference.

As shown in FIG. 1, videoconferencing device 102(1) communicates directly with MBAN 104(1), and videoconferencing device 102(2) communicates directly with MBAN 104(2). During a call session, each MBAN 104(1) and 104(2) monitors a condition indicative of a bandwidth of the network routing path, and adjusts the transmit bit-rate of the multimedia stream based on (and to adapt to) the condition indicative of the bandwidth of the network routing path. MBAN 104(1) receives the first multimedia stream from videoconferencing device 102(1), transmits the first multimedia stream and monitors at least one condition indicative of the bandwidth of the network routing path through the network 106(1) to MBAN 104(2). MBAN 104(2) receives the second multimedia stream from second videoconferencing device 102(2), transmits the second multimedia stream and monitors at least one condition indicative of the bandwidth of the network routing path through network 106 to MBAN 104(1).

For reliable delivery of a multimedia stream, the bandwidth of the network routing path of the multimedia stream should be greater than the transmit bit-rate of the multimedia stream. However, due to the nature of IP networks, bandwidth is rarely guaranteed and fluctuates. When the bandwidth of the path decreases below the transmit bit-rate of the multimedia stream, packets will be dropped, and the quality of the multimedia stream may be compromised. By monitoring conditions indicative of the bandwidth of the network routing path(s) on which a multimedia stream travels and dynamically adjusting the transmit bit-rate of the multimedia stream, the MBANs 104(1) and 104(2) respond to changing network conditions and effectively manage a streaming session. Moreover, the monitoring and adjusting operations are performed at devices, e.g., the MBANs, which are not the source or destination endpoint devices for the multimedia stream but rather are network devices which are at intermediate points on a network routing path of the multimedia stream that is being sent from a source device to a destination device.

Figure 2:
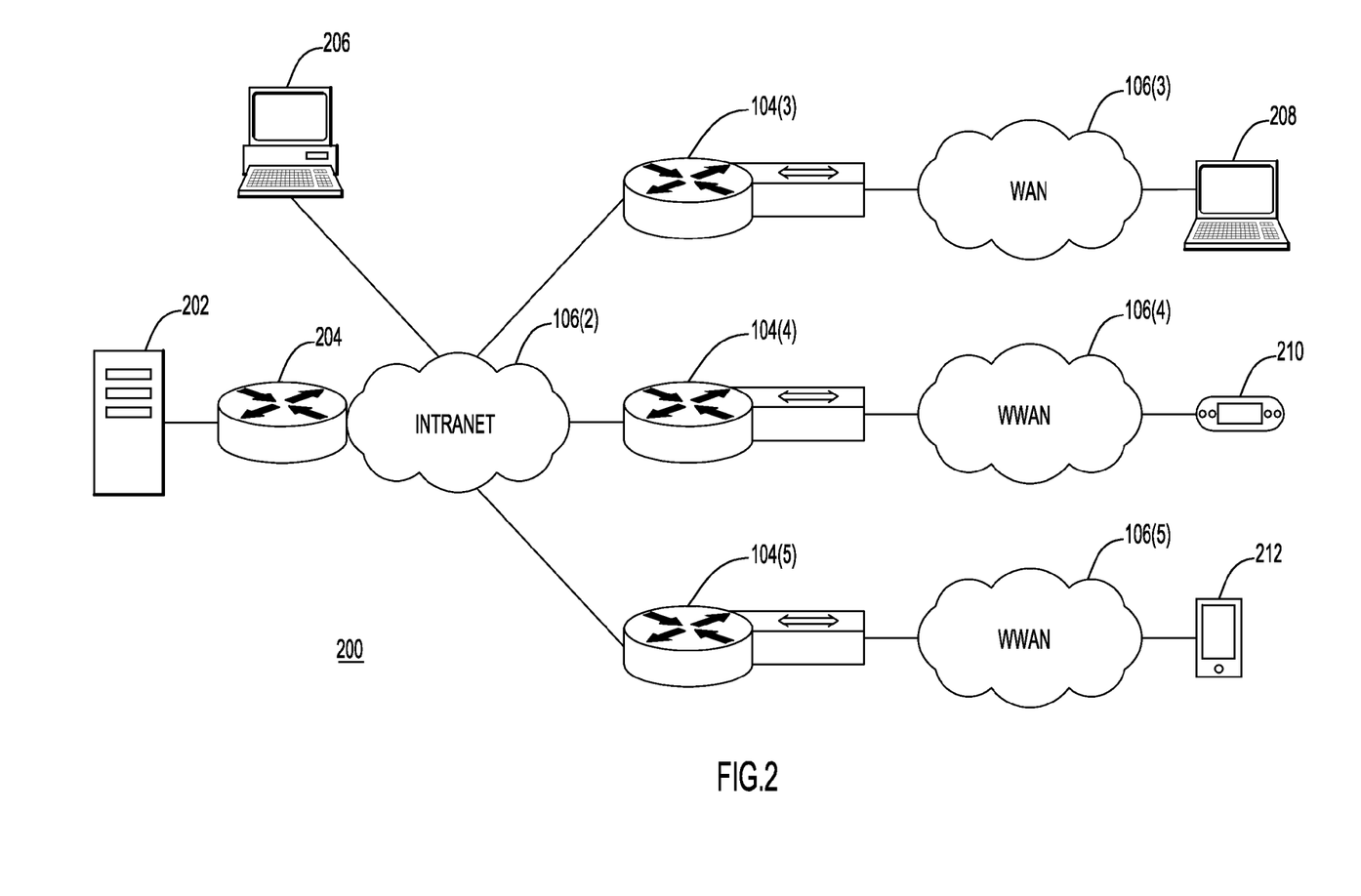

Referring now to FIG. 2, an example of a multicast distribution network 200 is shown in which a multimedia stream from a source device 202 is multicasted to multiple devices over different network paths. A router 204 receives the multimedia stream from the source device 202 and supplies it first to an internal or local area network (Intranet) 106(2) for multicast distribution. Personal computer 206 receives the multicast multimedia stream over a network path in the Intranet 106(2). Laptop 208 receives the multimedia stream over a network routing path that includes a MBAN 104(3) and travels through a wide area network (WAN) 106(3). Video game device 210 receives the multimedia stream over a network routing path that includes MBAN 104(4) and a path through a wireless WAN (WAN) 106(4). Smart phone 212 receives the multimedia stream over a network path that includes MBAN 104(5) and a path through WWAN 106(5). Because the network routing path between source device 202 and each destination device is different, the multimedia stream is subjected to varying network conditions on its path to each viewing device. Accordingly, each MBAN 104(3)-104(5) may adjust the multimedia stream differently according to bandwidth conditions on each separate network routing path. FIG. 2 shows that the MBAN may be deployed logically proximate to the streaming source, or in a multicast application, the MBAN is deployed where the network is most unstable, such as a gateway to a wireless network, as is the case for MBAN 104(4) and 104(5). Again, the MBANs are not the source or destination endpoint devices associated with the multimedia stream, but rather are network devices at intermediate points on a network routing path on which a multimedia stream is being sent from a source device to a destination device.

By positioning multiple MBANs in a network path of a multimedia stream, the transmit bit-rate of a multimedia bit stream may be tailored for each network path. MBAN 104(3) is positioned between network 106(2) and network 106(3). Thus, MBAN 104(3) monitors a condition of the bandwidth of the path through WAN 106(3) to reach the laptop 208. MBAN 104(4) is positioned between network 106(2) and network 106(4). Thus, MBAN 104(4) monitors a condition of the bandwidth of the path through WWAN 106(4) to reach the video game device 210. MBAN 104(5) is positioned between network 106(2) and network 106(5) to monitor a condition of the bandwidth of the path through WWAN 106(5) to reach the smart phone 212. To generalize, the bandwidth monitoring and adjusting (shaping) of the transmit bit-rate may be performed at multiple intermediate points on respective (different) network paths between a source and destination to separately adjust the transmit bit-rate at the different intermediate points in order to adapt to conditions indicative of the bandwidth of the corresponding different network paths. Moreover, the monitoring and adjusting operations are performed at respective network devices at corresponding ones of the intermediate point on the different network paths.

Figure 3:
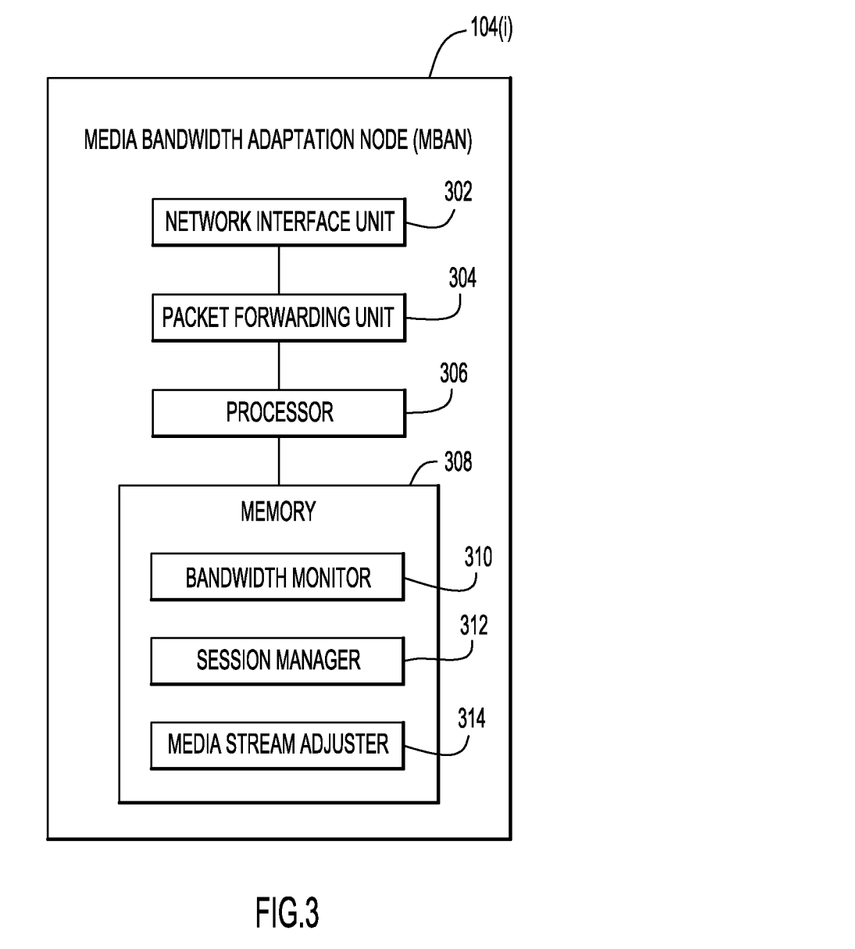
FIG. 3 is a block diagram of an example of a device that adjusts a transmit bit-rate of a multimedia stream based on a bandwidth of a network path.

FIG. 3 shows a block diagram of an MBAN generically shown at reference numeral 104(i) that dynamically adjusts a transmit bit-rate of a multimedia stream using the techniques described herein. The MBAN includes a network interface unit 302 and a packet forwarding unit 304, or other similar components, that transmit and receive packets, such as packets that are part of a multimedia stream, across a network. A processor (e.g., a controller, microprocessor, microcontroller, digital signal processor, etc.) 306 connects to the packet forwarding unit 304 and supplies packets of a multimedia stream to the packet forwarding unit to be transmitted on the path in the network and to perform higher level functions with respect to the multimedia stream.

A memory device 308 is provided that stores data and instructions executed by the processor 306. The memory 308 may be read only memory (ROM), random access memory (RAM), magnetic disk storage media devices, optical storage media devices, flash memory devices, electrical, optical, or other physical/tangible memory storage devices. The memory 308 stores instructions (also called process logic) for a bandwidth monitor function 310, a session manager function 312 and a media stream adjuster function 314. The processor 306 executes the instructions stored in the memory 308 for the bandwidth monitor function 310, session manager function 312 and media stream adjuster function 314. Thus, in general, the memory 308 is one or more computer readable storage media (e.g., a memory device) encoded with software comprising computer executable instructions and when the software is executed (by the processor 306) it is operable to perform the operations described herein in connection with functions 310, 312 and 314.

The MBAN 104(i) may be dedicated piece of equipment installed in the network or may include an existing network device (e.g., switch, gateway, router, hub, etc.) and the operations of the MBAN described herein may be an enhancement (via software or firmware upgrade) to an existing network device.

During a streaming session, the bandwidth monitor 310 monitors a condition indicative of the bandwidth of the path of the multimedia stream. Conditions indicative of a bandwidth of the network path include, for example and without limitation, packet drop rates, round trip delays, packet retransmission rates, and transmission failure rates. The session manager 312 dynamically manages adjusting the transmit bit-rate by inserting, adjusting, or removing a transrating session during the streaming session. During a transrating session, the transmit bit-rate of a multimedia bit stream from MBAN 104(i) is dynamically adjusted so as to account for the current bandwidth conditions of the network path. Media stream adjuster 314 adjusts the transmit bit-rate of the multimedia stream based on the condition indicative of the bandwidth of the path. There are numerous techniques that can be employed in software or hardware to adjust the transmit bit-rate of a multimedia stream. One of these techniques is multimedia transrating. This technique involves receiving a multimedia input stream at a bit-rate and generating one or more multimedia output streams at different bit-rates.

The operations of the bandwidth monitor function 310, session manager function 312 and media stream adjuster function 314 are described hereinafter in connection with the flow charts of FIGS. 4-6.

Figure 4:
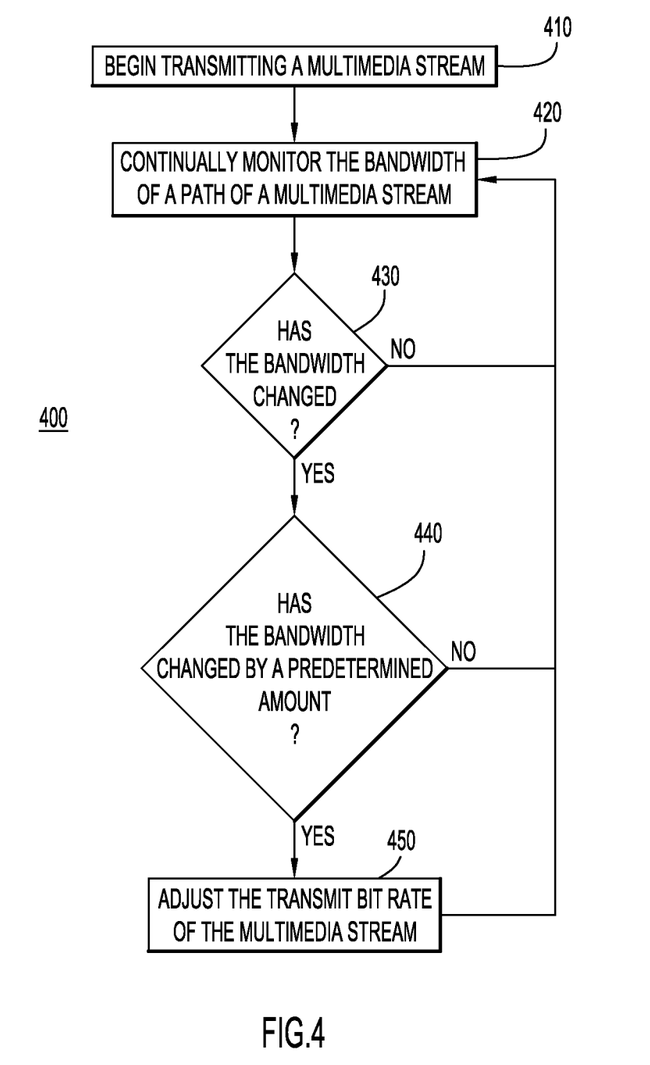
FIG. 4 is a flow chart depicting examples of operations to shape a multimedia stream bit-rate to adapt to the bandwidth of a network path.

Referring now to FIG. 4, a flow chart depicting a process 400 that shapes a multimedia stream bit-rate to adapt to an IP network bandwidth is described. Generally, to the process 400 involves monitoring a condition indicative of the bandwidth of the network path on which a multimedia stream is being sent from a source to a destination, and at an intermediate point between the source and destination on the network path of the multimedia stream, adjusting a transmit bit-rate of the multimedia stream based on the condition indicative of the bandwidth of the network path. At 410, the MBAN receives the multimedia stream and transmits it at some initial or default transmit bit-rate. Initially, MBAN may transmit the multimedia stream at the same bit-rate as it is received. In one example, the MBAN may directly pass the streams from its input to its output. The multimedia stream may originate from devices such as videoconferencing devices 102(1) and 102(2) and/or from a source device 202 associated with a multicast stream. The multimedia stream may be communicated directly to an MBAN from an originating device, or travel through one or more networks before being received by the MBAN.

At 420, while the multimedia stream is being transmitted, the bandwidth of a network path of a multimedia stream at an intermediate point between the source and destination of multimedia stream is monitored. For example, the MBAN performs operation 420 by the bandwidth monitor function 310 that monitors a condition indicative of a bandwidth of the path. Examples of how bandwidth monitor 310 may monitor the bandwidth are described in further detail below with reference to FIG. 5. The MBAN may periodically monitor the bandwidth using any of the techniques described herein.

At 430, a determination is made as to whether the bandwidth has changed since the last monitoring report. Again, operation 430 may be performed by the bandwidth monitor function 310 of the MBAN. When bandwidth monitor 310 determines that the bandwidth has not changed, then bandwidth monitor 310 may continue to monitor the bandwidth of the path of the multimedia stream during the streaming session and periodically (or on demand) generate bandwidth monitor reports.

When, at 430, it is determined that the bandwidth has changed (e.g., increased or decreased), then at 440, it is determined whether the bandwidth has changed by a predetermined amount. Operation 440 is performed, for example, by the session manager function 312 of the MBAN. A minor change in bandwidth may not necessitate an adjustment in the transmit bit-rate of the multimedia stream. A predetermined threshold for bandwidth change may be used for the evaluation at operation 440 to determine when the change in condition indicative of bandwidth satisfies a predetermined threshold that significantly affects the quality of a streaming session to warrant a change in the transmit bit-rate of the multimedia stream. In one example, session manager 312 may set a threshold of a 5% packet drop rate for a streaming session. During a streaming session, the packet drop rate fluctuates from 2% to 4%. If the packet drop rate does not reach or exceed 5%, the session manager 312 determines that the bandwidth change does not exceed the predetermined threshold, and the media stream adjuster 314 does not adjust the transmit bit-rate of the multimedia stream.

However, when it is determined that the bandwidth has changed by at least a predetermined amount, then at 450, the transmit bit-rate of the multimedia stream is adjusted. For example, this operation is performed by the media stream adjuster function 314 of the MBAN, and may involve increasing or decreasing the transmit bit-rate of the multimedia stream based on the condition indicative of the bandwidth of the path. Examples of adjustments to the transmit bit-rate are described in further detail below with reference to FIG. 6 and FIGS. 7a and 7b.

The transmit bit-rate may be adjusted incrementally. For example, the transmit bit-rate of the multimedia stream may be reduced by a certain percentage, such as 5%. After the first reduction in transmit bit-rate of the multimedia stream, it is determined whether to further adjust the transmit bit-rate based on the bandwidth of the path after the first reduction. If a condition indicative of a reduced bandwidth still persists, such as a high packet drop rate, then the transmit bit-rate may be incrementally decreased one or more times further, until the condition indicative of reduced bandwidth ceases. An example of incrementally adjusting transmit bit-rate is described in further detail below with reference to FIG. 8.

A goal of the techniques described herein is to transmit the multimedia stream with the fastest bit-rate allowable for the current conditions of the network. In one example, it is determined when the bandwidth of the network path has decreased by a predetermined amount, and in response the transmit bit-rate of the multimedia bit stream is reduced. Conversely, it is determined when the bandwidth of the network path has increased by a predetermined amount, and in response the transmit bit-rate is increased.

Figure 5:
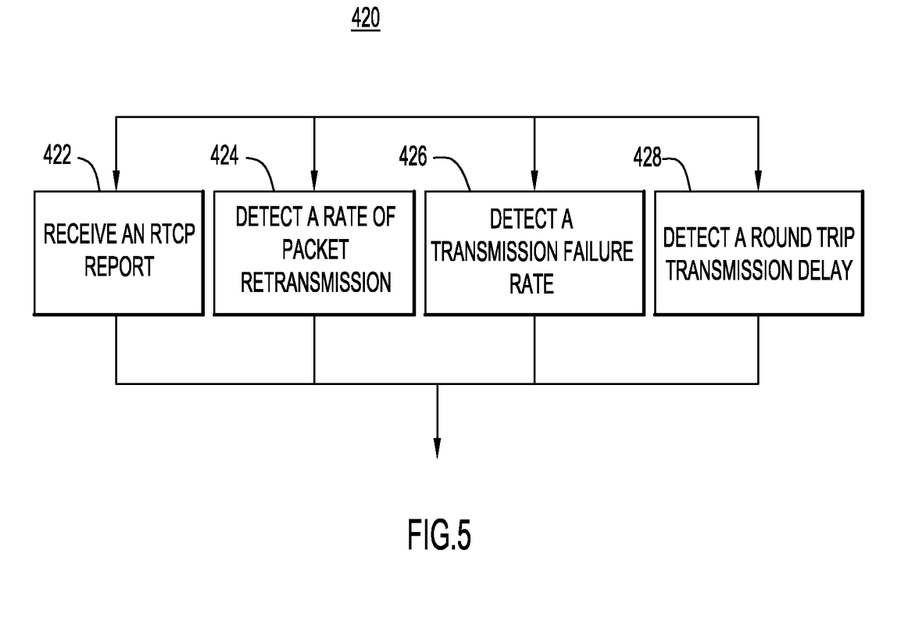
FIG. 5 is a flow chart depicting examples of techniques for monitoring a condition indicative of a bandwidth of a network path on which a multimedia stream is transmitted.

FIG. 5 is a flow chart illustrating examples for techniques to monitor a condition indicative of a bandwidth of a path. These operations are performed, for example, by the bandwidth monitor function 310 of the MBAN. Although the actual bandwidth of the network path may not be determined, monitoring a condition indicative of the bandwidth may provide a useful indicator for adjusting the transmit bit-rate of a multimedia bit stream. The MBAN monitors the bandwidth changes or directly probes the network paths to determine a condition indicative of the bandwidth. Different use cases may use different schemes to detect and monitor the bandwidth. A feedback mechanism may be employed for some of these techniques. Any one or more of the techniques depicted in FIG. 5 may be employed to determine a condition indicative of the bandwidth of the network path on which the multimedia stream is transmitted.

At 422, MBAN 104($i$) receives a Real-Time Transport Control Protocol (RTCP) report. This is useful for RTP streaming of multimedia and for video point-to-point calls. In one example, one or more networking nodes along a network path in a multimedia streaming session implement RTCP. During a streaming session, each RTCP implementer gathers statistics related to quality aspects of the multimedia stream distribution during the streaming session and transmits this data in the form of an RTCP report. An RTCP report may provide feedback on the quality of service (QoS) of the transmission of a multimedia stream by periodically sending statistics and control information during a streaming session. As one example, an MBAN may receive a RTCP report from a downstream network node, the report including a packet drop rate and/or a round trip delay associated with a streaming session. Some amount of packet drops may be considered normal during a streaming session, and may not impact the overall quality of the streaming session. However, when an unusual increase in the packet drop rate is detected, the change in packet drop rate could indicate a bandwidth decrease along a network path from the source of the multimedia stream to the destination. A transrating session may be inserted to lower the transmit bit-rate of the multimedia stream. The transmit bit-rate of the multimedia stream may be continually adjusted until the packet drop rate returns to a normal or more acceptable value.

When one or more nodes along a network path do not implement RTCP, the MBAN may emulate RTCP. For example, the MBAN may periodically transmit specially configured "sender" information packets. Another node along the network path, such as another MBAN, may receive and recover the information in the one or more sender information packets, and transmit "receiver" information packets. The MBANs are configured to understand the "sender" and "receiver" information packets so as to emulate a RTCP control environment and derive a condition indicative of a bandwidth of the network paths.

At 424, a rate of packet retransmission is detected. An increase or decrease in the rate of packet retransmission may indicate an increase or decrease in bandwidth along the network path. In one example, a multimedia streaming session may be conducted via the Transmission Control Protocol (TCP). During TCP communication, one or more packets may be retransmitted to a downstream node if receipt of the one or more packets is not acknowledged by the downstream node. The rate or frequency at which packets need to be resent is useful as an indication of the bandwidth of the network path.

At 426, a transmission failure rate is detected. For example, in wireless networks, the wireless transmission medium is shared, and its condition may directly affect bandwidth available for packet delivery. When a packet is not acknowledged and it still cannot be successfully delivered even upon retransmission, the transmission of the packet is deemed a failure. The MBAN may keep track of the number of transmission failures to generate a transmission failure rate statistic that reflects the bandwidth of the network path.

At 428, a round trip transmission delay for a network path is detected. The round trip transmission delay may be detected by transmitting one or more packets, e.g., probe packets, along a network path and measuring the length of time for the return of the packet from a node in the network path. In one example. MBAN 104(1) sends a series of Internet Control Message Protocol (ICMP) echo request packets to videoconferencing device 102(2) Transmission and receipt of the ICMP echo request packets may include transmission statistics such as the minimum, maximum, and the mean round trip times of echo request packets, as well as a record of dropped packets. By analyzing such statistics, a round trip transmission delay may be calculated, and changes in the round trip transmission delay may be associated with changes in bandwidth along the network path.

Figure 6:
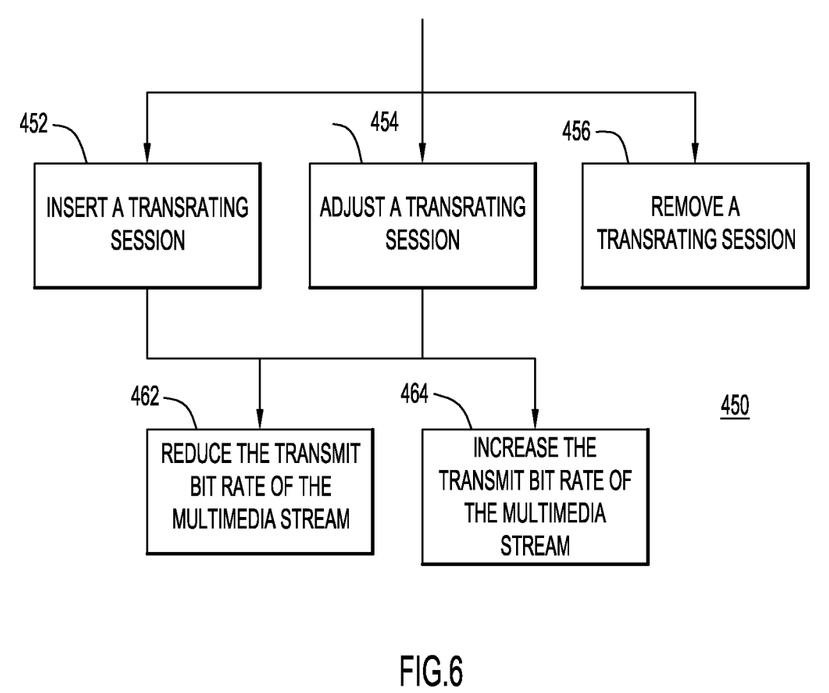
FIG. 6 is a flow chart depicting examples of operations to adjust a transmit bit-rate of a multimedia stream.

Turning now to FIG. 6, the operations for adjusting a transmit bit-rate of a multimedia stream are described in more detail. These operations corresponding to operation 450 shown in FIG. 4 and may be performed by the session manager function 312 and media stream adjuster function 314 in a MBAN. The bit-rate of the multimedia stream may be adjusted by inserting, adjusting, or removing a transrating session. At 452, a transrating session is inserted. For example, the session manager function 312 may insert a transrating session after the bandwidth monitor function 310 detects that the bandwidth of the path has decreased below an initial threshold. When session manager 312 inserts a transrating session at 452 for this situation, the transmit bit-rate of the multimedia stream is reduced at 462 by, for example, the media stream adjuster function 314. The session manager function 314 may insert a transrating session based at least in part on other conditions, such as a prolonged indication of bandwidth reduction. As one example, the bandwidth monitor function 310 may briefly detect a decreased bandwidth. The session manager 312, however, may delay the insertion of a transrating session until the decreased bandwidth persists over a period of time, such as 1-10 seconds. In the example, a brief half second bandwidth fluctuation may not be long enough for the session manager 312 to insert a transrating session.

Even after an initial reduction in the transmit bit-rate of the multimedia stream, the condition indicative of the bandwidth of the path may still indicate that there is insufficient bandwidth for the multimedia stream at its reduced transmit bit-rate. At 454, an existing transrating session is adjusted. For example, the session manager 312 may adjust the transrating of a multimedia stream based on the condition indicative of the bandwidth of the path. When session manager 312 adjusts the transrating session, media stream adjuster 314 may either reduce the transmit bit-rate of the multimedia stream at 462 or increase the transmit bit-rate of the multimedia stream at 464. Although the bandwidth of the network path may initially fluctuate downward, resulting in the need to reduce the transmit bit-rate, the bandwidth of the network path my subsequently increase, resulting in an opportunity to increase to the transmit bit-rate. The session manager 312 may dynamically manage a transrating session, resulting in incremental changes to the transmit bit-rate of the multimedia bit stream. By incrementally increasing or decreasing the transmit bit-rate, the session manager 312 may ensure that the multimedia stream is transmitted at the highest bit-rate tolerated by the bandwidth of the network path.

At 456, a transrating session for a multimedia stream is removed. For example, the network conditions may have stabilized such that there is no longer the need to adjust the transmit bit-rate of a multimedia stream. After the transrating session is removed, or ended, the network path is still monitored for changes in bandwidth.

Figure 7A:
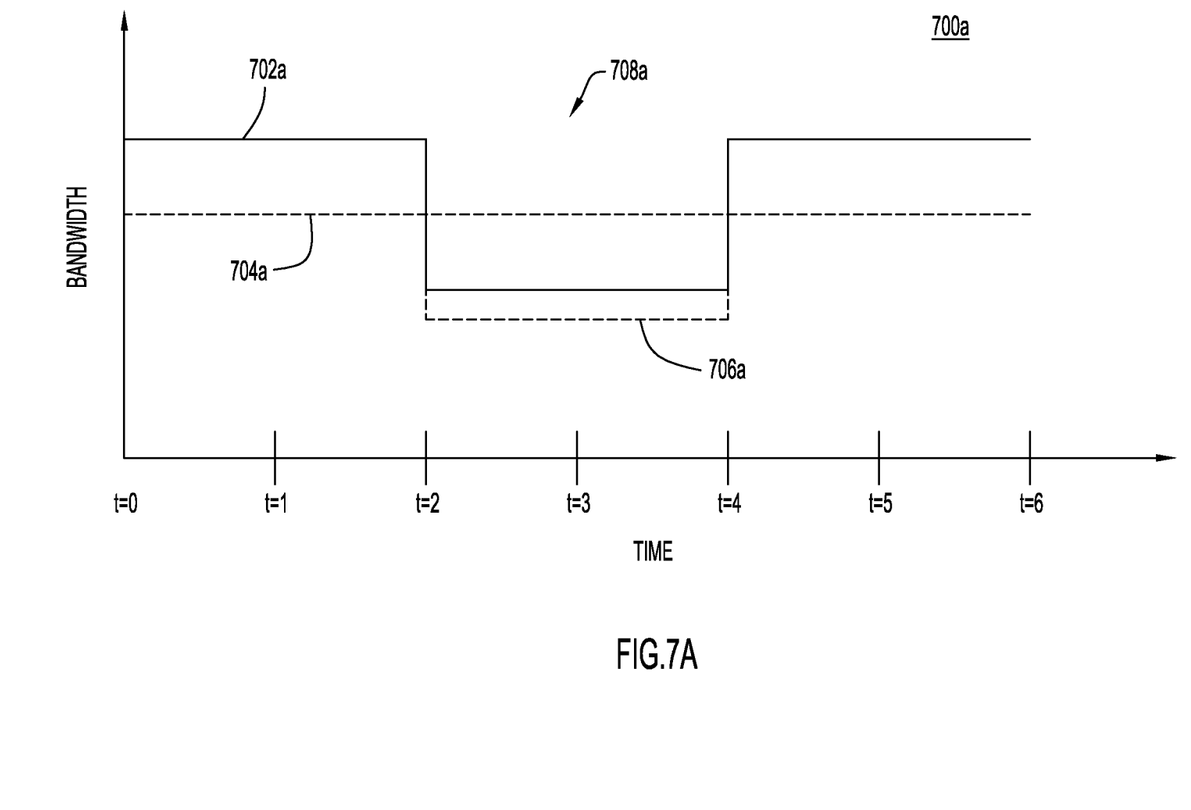
FIGS. 7a and 7b are timing diagrams that illustrate examples of adjusting a transmit bit-rate of a multimedia stream.
Figure 7B:
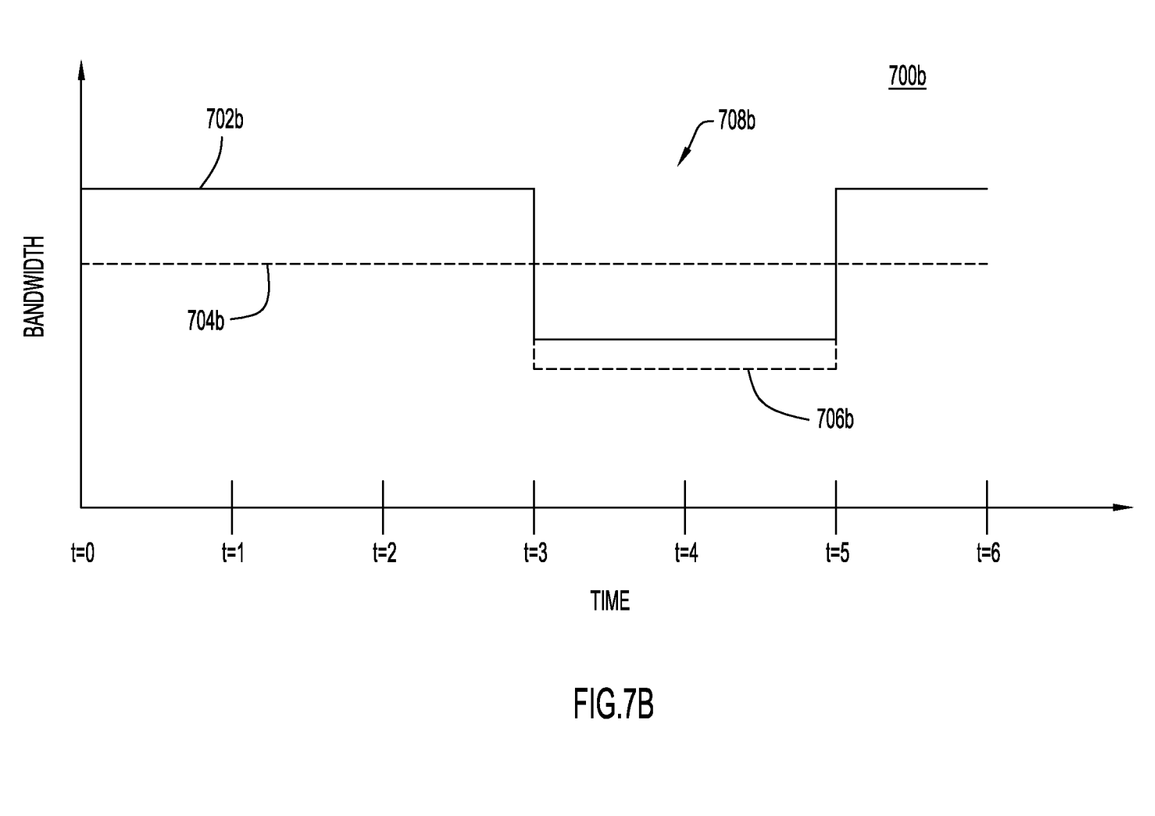

Reference is now made to FIGS. 7a and 7b. These figures show timing diagrams that illustrate examples of the techniques described herein for shaping a bit-rate of a multimedia bit stream to adapt to bandwidth conditions of a network. Timing diagrams 700a and 700b illustrate bandwidth on the vertical axis and time on the horizontal axis. In diagram 700a, the bandwidth of the network path being monitored is represented by solid line 702a. For example, the line 702a represents the bandwidth of the network path between a source device and a destination device, e.g., between videoconferencing devices 102(1) and 102(2) shown in FIG. 1, over time. As shown in FIG. 7a, bandwidth 702a fluctuates (e.g., increases and decreases) over time. Dashed line 704a depicts the transmit bit-rate of the multimedia stream from a source device, e.g., videoconferencing device 102(1). Dashed line 706a represents an adjusted transmit bit-rate of the multimedia stream generated by an MBAN (at an intermediate point on a network path) during a transrating session 708a according to the techniques described herein.

When bandwidth 702a is greater than the source transmit bit-rate 704a, the multimedia stream can be effectively transmitted across the network path with little or no dropped frames, and therefore a transrating session is not necessary. When the bandwidth 702a falls below the source transmit bit-rate, however, a transrating session is necessary. Initially at t=0, bandwidth 702a is sufficient to transmit the multimedia stream at its original transmit bit-rate. Later, however, at t=2, bandwidth 702a decreases. As a result of the decreased bandwidth, a transrating session 708a is inserted and the transmit bit-rate is adjusted as represented by line 706a. For the duration of the transrating session, transmit bit-rate 706a may be incrementally adjusted (reduced) to reach an optimal transmit bit-rate 706a for the reduced bandwidth 702a. Finally, at t=4, the bandwidth increases and the transrating session 708a can be terminated since the transmit bit-rate is back to its original level.

Timing diagram 700b is similar to diagram 700a except it applies to a multimedia stream sent from the other device, e.g., a videoconference device 102(2) to videoconference device 102(1). The bandwidth of the network path between videoconferencing device 102(2) and videoconferencing device 102(1) over time is represented by the solid line 702b. The transmit bit-rate from the source device, e.g., videoconferencing device 102(2), is shown by dashed line 704b. The adjusted transmit bit-rate generated by an MBAN is shown at 706b during a transrating session 708b. Initially, at t=0, the bandwidth is sufficient to transfer the multimedia stream from videoconferencing device 102(2) at a normal transmit bit-rate. During a streaming session, the network path of a multimedia stream transmitted in one direction may have a different bandwidth than the same network path of a multimedia stream transmitted in an opposite direction. Thus, although bandwidth 702a falls at t=2 in FIG. 7a, bandwidth 702b does not decrease until t=3. Accordingly, at t=3, transrating session 708b is inserted and the transmit bit-rate of the multimedia stream is reduced. The transrating session 708b lasts for the duration of the reduced bandwidth. At t=5, the bandwidth returns to a more normal level. As a result the transrating session 708*b* is terminated, and the transmit bit-rate 706*b* is returned to a more normal level.

FIGS. 7*a* and 7*b* illustrate that a transrating session is inserted only for the period of bandwidth decrease and it is removed when the bandwidth returns to a more normal level. One special case is when the initial bandwidth is below the source bit-rate when a video call is being setup due to the unknown network conditions between the endpoints. For this case, a transrating session will be inserted immediately and perhaps for the entire call.

Figure 8:
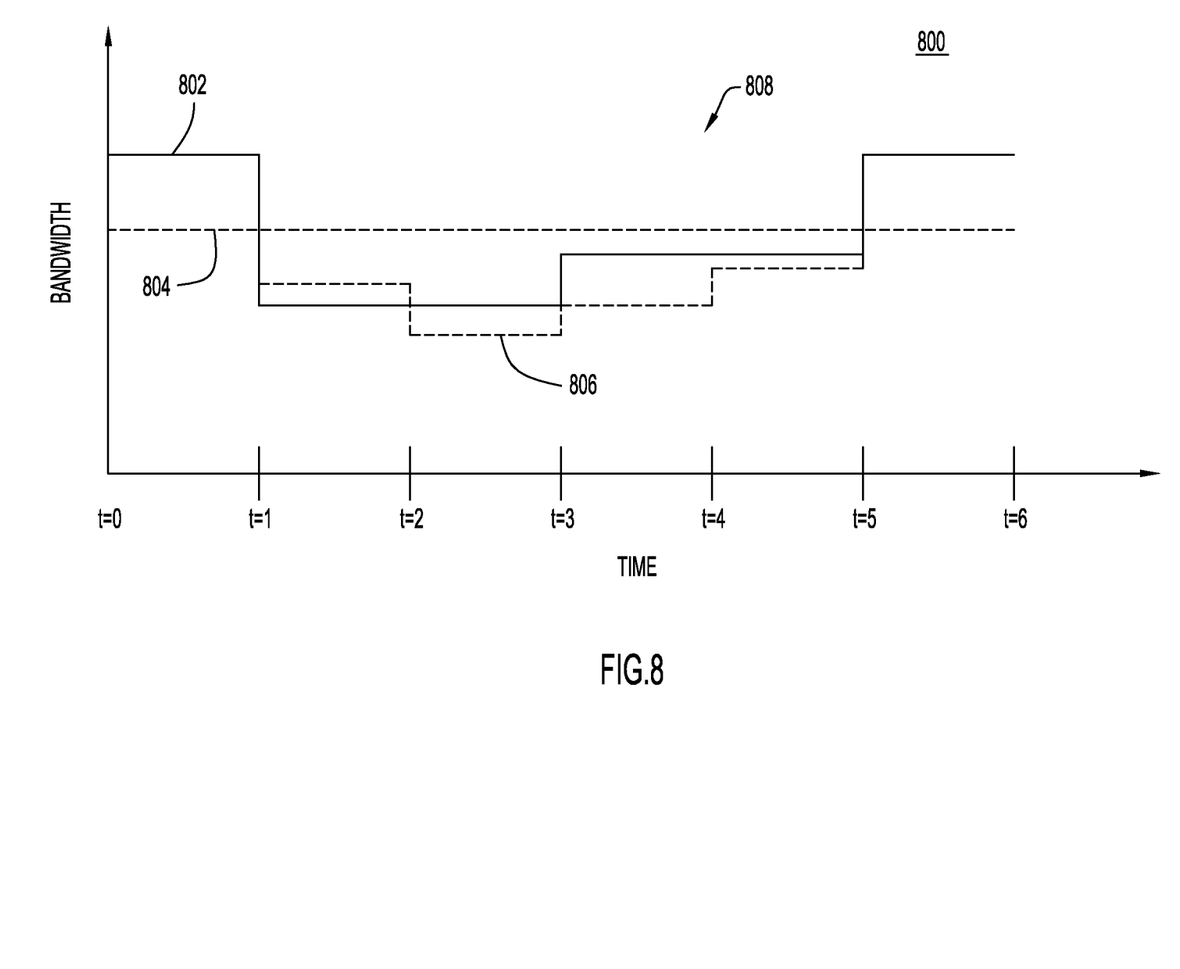
FIG. 8 is a timing diagram that illustrates an example of incrementally adjusting a transmit bit-rate of a multimedia stream.

FIG. 8 is a timing diagram 800 that illustrates incrementally adjusting a transmit bit-rate of a multimedia stream. The bandwidth for a network path between a source device and a destination device is shown by solid line 802. The source transmit bit-rate is shown by dashed line 804. The transmit bit-rate of the multimedia stream generated by an MBAN is shown at 806. Initially, at t=0, the bandwidth is sufficient to transmit the multimedia stream without any adjustment. Later, at t=1, however, the bandwidth decreases beyond a predetermined threshold, e.g., below the source transmit bit-rate 804. In response to the decreased bandwidth, a transrating session 808 is inserted, and the transmit bit-rate is adjusted at or shortly after t=1. At t=2, the MBAN determines whether to further adjust transmit bit-rate. At t=2 the transmit bit-rate is adjusted a second time based on bandwidth of the path after the first adjustment. Finally, after t=2 and the second downward adjustment of transmit bit-rate, the transmit bit-rate is below the bandwidth of the network path.

At t=3, the MBAN determines whether to further reduce or increase transmit bit-rate based on the bandwidth, and in this example, determines to increase the transmit bit-rate because the bandwidth has increased. Again at t=4 and t=5, the MBAN determines whether to reduce or further increase transmit bit-rate and in this examples determines to further increase the transmit bit-rate. Finally, at t=5, the bandwidth 802 exceeds the source transmit bit-rate. As a result, the transrating session 808 is terminated.

In FIGS. 7*a*, 7*b* and 8, the triggering condition for changing the transmit bit-rate is a comparison between the transmit bit-rate and the bandwidth, such that the bandwidth itself is the threshold triggering condition. This is only an example. It may be still be desirable to change the transmit bit-rate of a multimedia stream even if it is greater than the bandwidth, but not by a sufficient amount. Thus, the threshold condition to trigger a change in the transmit bit-rate may be "padded" from the monitored condition indicative of the bandwidth.

In sum, techniques and devices are provided herein to monitor a condition of a bandwidth of a path on which a multimedia stream is being sent from a source to a destination. At an intermediate point between the source and destination on the network path of the multimedia stream, a transmit bit-rate of the multimedia stream is adjusted to adapt to the condition indicative of the bandwidth of the network path. These techniques are performed in network nodes (devices) automatically and without any involvement or action required by a client device (source or destination device of the multimedia stream). In this regard, the transrating adjustment is transparent to the client devices and requires no modification to the client devices.

The above description is intended by way of example only.

What is claimed is:

1. A method comprising:
monitoring a condition indicative of a bandwidth of a network path on which a multimedia stream is being sent from a source to a destination;
determining if the bandwidth has changed by at least a predetermined amount for a predetermined amount of time; and
responsive to determining that the bandwidth has changed by at least the predetermined amount for the predetermined amount of time, at an intermediate point between the source and the destination on the network path of the multimedia stream, adjusting a transmit bit-rate of the multimedia stream to adapt to the condition indicative of the bandwidth of the network path.

2. The method of claim 1, wherein monitoring and adjusting are performed at multiple intermediate points on different network paths between the source and the destination to separately adjust the transmit bit-rate at different intermediate points in order to adapt to conditions indicative of the bandwidth of the corresponding different network paths.

3. The method of claim 2, wherein monitoring and adjusting are performed at respective network devices at corresponding ones of the intermediate points on the different network paths.

4. The method of claim 1, wherein determining comprises determining when the bandwidth has decreased below the transmit bit-rate of the multimedia stream, and wherein adjusting comprises reducing the transmit bit-rate of the multimedia stream.

5. The method of claim 4, wherein adjusting comprises incrementally reducing the transmit bit-rate of the multimedia stream.

6. The method of claim 1, wherein determining comprises determining when the bandwidth has increased, and wherein adjusting comprises increasing the transmit bit-rate of the multimedia stream.

7. The method of claim 6, wherein adjusting comprises incrementally increasing the transmit bit-rate of the multimedia stream.

8. The method of claim 1, wherein monitoring the condition indicative of the bandwidth comprises receiving a real-time transport control protocol (RTCP) report.

9. The method of claim 8, wherein the RTCP report comprises at least one of a packet drop rate or a round trip delay.

10. The method of claim 1, wherein monitoring the condition indicative of the bandwidth comprises detecting a rate of packet retransmissions.

11. The method of claim 1, wherein monitoring the condition indicative of the bandwidth comprises detecting a transmission failure rate.

12. The method of claim 1, and further comprising determining when the bandwidth of the network path decreases by a predetermined amount, and adjusting comprises reducing the transmit bit-rate of the multimedia stream, and further comprising determining whether to further reduce or to increase the transmit bit-rate of the multimedia stream based on the bandwidth of the network path after the adjusting.

13. The method of claim 1, wherein monitoring of the condition indicative of the bandwidth comprises emulating real-time transport control protocol (RTCP) by transmitting packets to a second intermediary device and receiving packets from the second intermediary device.

14. An apparatus comprising:
a network interface unit configured to interface to a network;
a packet forwarding unit configured to receive and forward packets on a network path in the network; and
a controller configured to:
monitor a condition indicative of the bandwidth of the network path on which a multimedia stream is being sent from a source to a destination;

determine if the bandwidth has changed by a predetermined amount for a predetermined amount of time; and responsive to determining that the bandwidth has changed by at least the predetermined amount for the predetermined amount of time, at an intermediate point between the source and the destination on the network path of the multimedia stream, adjust a transmit bit-rate of the multimedia stream to adapt to the condition indicative of the bandwidth of the network path.

15. The apparatus of claim 14, wherein the controller is configured to determine when the bandwidth has decreased below the transmit bit-rate of the multimedia stream, and to reduce the transmit bit-rate of the multimedia stream.

16. The apparatus of claim 14, wherein the controller is configured to determine when the bandwidth has increased, and to increase the transmit bit-rate of the multimedia stream.

17. The apparatus of claim 14, wherein the controller is configured to determine when the bandwidth of the network path decreases by a predetermined amount to reduce the transmit bit-rate of the multimedia stream, and to determine whether to further reduce or to increase the transmit bit-rate of the multimedia stream based on the bandwidth of the network path after making the adjustment to the transmit bit-rate.

18. The apparatus of claim 14, wherein the controller is configured to emulate real-time transport control protocol (RTCP).

19. One or more non-transitory computer readable storage media encoded with software comprising computer-executable instructions and when the software is executed operable to:

monitor a condition indicative of the bandwidth of a network path on which a multimedia stream is being sent from a source to a destination;

determine if the bandwidth has changed by at least a predetermined amount for a predetermined amount of time; and responsive to determining that the bandwidth has changed by at least the predetermined amount for the predetermined amount of time, at an intermediate point between the source and the destination on the network path of the multimedia stream, adjust a transmit bit-rate of the multimedia stream based on the condition indicative of the bandwidth indication of the network path.

20. The non-transitory computer readable storage media of claim 19, wherein the instructions that are operable to determine when the bandwidth has changed comprise instructions operable to determine when the bandwidth has decreased, and wherein the instructions that are operable to adjust comprise instructions that are operable to reduce the transmit bit-rate of the multimedia stream.

21. The non-transitory computer readable storage media of claim 19, wherein the instructions that are operable to monitor the bandwidth comprise instructions that are operable to determine when the bandwidth of the network routing path decreases below the transmit bit-rate, and wherein the instructions that are operable to adjust comprise instructions that are operable to reduce the transmit bit-rate of the multimedia stream, and further comprising instructions that are operable to determine whether to further reduce or to increase the transmit bit-rate of the multimedia stream based on the bandwidth of the network routing path after making the adjustment.

22. The non-transitory computer readable storage media of claim 19, wherein the instructions that are operable to monitor the bandwidth comprise instructions that are operable to emulate real-time transport control protocol (RTCP).

\* \* \* \* \*